(12) United States Patent
Zhu et al.

(10) Patent No.: US 11,543,009 B2
(45) Date of Patent: Jan. 3, 2023

(54) HYBRID MULTI-MODE SWITCHING CONTINUOUSLY VARIABLE TRANSMISSION SYSTEM

(71) Applicant: JIANGSU UNIVERSITY, Jiangsu (CN)

(72) Inventors: Zhen Zhu, Jiangsu (CN); Yingfeng Cai, Jiangsu (CN); Long Chen, Jiangsu (CN); Changgao Xia, Jiangsu (CN); Jiangyi Han, Jiangsu (CN); Dehua Shi, Jiangsu (CN); Feng Wang, Jiangsu (CN); Chaochun Yuan, Jiangsu (CN); Chaofeng Pan, Jiangsu (CN); Xing Xu, Jiangsu (CN)

(73) Assignee: JIANGSU UNIVERSITY

( * ) Notice: Subject to any disclaimer, the term of this patent is extended or adjusted under 35 U.S.C. 154(b) by 0 days.

(21) Appl. No.: 16/627,690

(22) PCT Filed: Jan. 24, 2019

(86) PCT No.: PCT/CN2019/072880
§ 371 (c)(1),
(2) Date: Dec. 30, 2019

(87) PCT Pub. No.: WO2020/147141
PCT Pub. Date: Jul. 23, 2020

(65) Prior Publication Data
US 2021/0331575 A1    Oct. 28, 2021

(30) Foreign Application Priority Data
Jan. 16, 2019   (CN) .......................... 201910041132.1

(51) Int. Cl.
*F16H 47/04*    (2006.01)
(52) U.S. Cl.
CPC .................................. *F16H 47/04* (2013.01)

(58) Field of Classification Search
CPC ........................... F16H 47/04; F16H 2047/045
See application file for complete search history.

(56) References Cited

U.S. PATENT DOCUMENTS 5,976,046 A * 11/1999 Larkin .................... F16H 47/04
475/72
2009/0075774 A1   3/2009 Tabata et al. ................. 475/150
(Continued)

FOREIGN PATENT DOCUMENTS

| CN | 1926356 | 3/2007 | ............. B60K 17/04 |
| CN | 101018685 | 8/2007 | ............. B60K 17/04 |

(Continued)

OTHER PUBLICATIONS

International Search Report (w/English translation) and Writen Opinion issued in PCT/CN2019/072880, dated Oct. 23, 2019, 9 pages.

*Primary Examiner* — Erin D Bishop
(74) *Attorney, Agent, or Firm* — Hayes Soloway P.C.

(57) ABSTRACT

A continuously variable transmission system for hybrid power multi-mode switching, includes an input component, an output component, a clutch assembly, a brake, a hydraulic transmission assembly and a planetary gear assembly, wherein the input component is connected with the hydraulic transmission assembly, the output component is connected with the planetary gear assembly, the clutch assembly connects the input component and the hydraulic transmission assembly to the planetary gear assembly respectively, and the brake and the clutch assembly provide a transmission ratio for continuous forwarding or backwarding continuously between the input component and the output component. The hydro-mechanical transmission is switched to mechanical transmission by increasing the displacement ratio of the hydraulic transmission assembly linearly or non-linearly.

6 Claims, 3 Drawing Sheets

(56) References Cited

U.S. PATENT DOCUMENTS

2016/0230850 A1    8/2016   Kanada et al. ......... F16H 3/724
2017/0175867 A1*   6/2017   Gross .................... F16H 61/468

FOREIGN PATENT DOCUMENTS

| CN | 102139626 | 8/2011 | ............... B60K 6/08 |
| CN | 105531137 | 4/2016 | ............. B60K 6/365 |
| CN | 107044514 | 8/2017 | ............. B60K 6/543 |

* cited by examiner

HYBRID MULTI-MODE SWITCHING CONTINUOUSLY VARIABLE TRANSMISSION SYSTEM

I. TECHNICAL FIELD

The present invention relates to the field of continuously variable transmission (CVT) devices, in particular to a hybrid multi-mode switching continuously variable transmission (CVT) system.

II. BACKGROUND ART

Hydraulic transmission realizes flexible operation by energy form transformation, but has relatively low transmission efficiency; mechanical transmission has a transmission ratio that generally varies in a stepped manner, but has relatively high transmission efficiency. Hydro-mechanical transmission incorporates the advantages of hydraulic transmission and mechanical transmission, has advantages such as stepless speed change, high transmission efficiency, and high transmission power, etc., and is an ideal transmission form for heavy vehicles. Hydro-mechanical transmission is divided into two categories: input split transmission and output split transmission, with respective advantages and disadvantages; a mechanical-hydraulic compound transmission system, which integrates hydraulic transmission, mechanical transmission and hydro-mechanical transmission, is adaptive to different operating conditions, and is the development direction of transmission systems in the future.

III. CONTENTS OF THE INVENTION

In view of the drawbacks in the prior art, the present invention provides a hybrid multi-mode switching continuously variable transmission (CVT) system, which integrates hydraulic transmission, hydro-mechanical transmission and mechanical transmission by switching the clutch and brake and adjusting the displacement ratio of the hydraulic system.

The above technical objectives of the present invention are achieved by the following technical means:

A hybrid multi-mode switching continuously variable transmission system, comprising an input component, an output component, a clutch assembly, a brake, a hydraulic transmission assembly and a planetary gear assembly, wherein the input component is connected with the hydraulic transmission assembly, the output component is connected with the planetary gear assembly, the clutch assembly connects the input component and the hydraulic transmission assembly to the planetary gear assembly respectively, and the brake and the clutch assembly provide a continuous forward or backward transmission ratio between the input component and the output component.

Furthermore, the forward or backward transmission modes provided between the input component and the output component by adjusting the displacement ratio of the hydraulic transmission assembly and selectively controlling the engagement between the clutch assembly and the brake include: hydraulic transmission, mechanical transmission, hydro-mechanical transmission, and reverse hydraulic transmission.

Furthermore, the switching of the forward transmission mode between the input component and the output component is realized by adjusting the displacement ratio of the hydraulic transmission assembly.

Furthermore, the switching of the forward transmission mode between the input component and the output component specifically is:
switching from hydraulic transmission to hydro-mechanical transmission by increasing the displacement ratio of the hydraulic transmission assembly linearly;
on the basis of hydro-mechanical transmission, switching from hydro-mechanical transmission to mechanical transmission by increasing the displacement ratio of the hydraulic transmission assembly linearly or non-linearly.

Furthermore, the planetary gear assembly comprises a planetary gear split mechanism and a planetary gear convergence mechanism; the clutch assembly comprises a first clutch, a second clutch, and a third clutch; a gear ring of the planetary gear split mechanism is connected with a sun gear of the planetary gear convergence mechanism;
the first clutch is configured to selectively connect the gear ring of the planetary gear split mechanism to a planet carrier of the planetary gear split mechanism to rotate together; the second clutch is configured to selectively connect the sun gear of the planetary gear convergence mechanism to the planet carrier of the planetary gear convergence mechanism to rotate together; the third clutch is configured to selectively connect the hydraulic transmission assembly to the planetary gear convergence mechanism to rotate together; and forward hydro-mechanical transmission between the input component and the output component is provided by adjusting the displacement ratio of the hydraulic transmission assembly and selectively controlling the engagement of the first clutch, the second clutch and the third clutch.

Furthermore, forward mechanical transmission between the input component and the output component is provided by adjusting the displacement ratio of the hydraulic transmission assembly and selectively controlling the engagement of the first clutch and the second clutch.

Furthermore, the clutch assembly further comprises a fourth clutch configured to selectively connect the hydraulic transmission assembly to the output component to rotate together; the brake is configured to selectively connect the gear ring of the planetary gear split mechanism to a fixed part; forward or backward hydraulic transmission between the input component and the output component is provided by adjusting the displacement ratio of the hydraulic transmission assembly and controlling the engagement of the fourth clutch and the brake.

Furthermore, forward hydro-mechanical transmission modes between the input component and the output component which are provided respectively by engaging the first clutch and the third clutch or engaging the second clutch and the third clutch are different from each other.

Furthermore, the power source of the input component comprises an engine power source and a motor power source; the engine power source is generated by an engine; the motor power source is composed of a power battery and a motor; and the engine power source and the motor power source form a hybrid power source, which is connected with the input component via a coupling device.

Furthermore, the hybrid multi-mode switching continuously variable transmission system is formed by controlling the engagement between dual power sources with different power mixing ratio and a compound transmission system.

The present invention attains the following beneficial effects:

1. In the hybrid multi-mode switching continuously variable transmission (CVT) system according to the present invention, by controlling four clutches, one brake and the displacement ratio of the hydraulic system, switching among one mechanical gear position, two hydraulic gear positions and two hydro-mechanical gear positions can be realized, and stepless speed change at lower gear position can be realized in a reverse gear and a forward gear.
2. The hybrid multi-mode switching continuously variable transmission (CVT) system in the present invention can output power through a power transmission mechanism to drive other devices.
3. The hybrid multi-mode switching continuously variable transmission (CVT) system is compact in structure and convenient to operate, and has less transmission gears and high transmission efficiency.
4. On the basis of hydro-mechanical transmission, the hybrid multi-mode switching continuously variable transmission (CVT) system in the present invention can be switched from hydro-mechanical transmission to mechanical transmission by increasing the displacement ratio of the hydraulic transmission assembly linearly or non-linearly.
5, The hybrid multi-mode switching continuously variable transmission (CVT) system in the present invention can realize the functions such as recovering energy and providing adequate power.
6. During gear shifting, the hybrid multi-mode switching continuously variable transmission (CVT) system in the present invention utilizes a dynamic torque control method to realize real-time compensation for engine torque from motor torque, and is beneficial for improving gear shifting quality and ride comfort of the vehicle. During power output, by increasing transmitted power, improving response speed, engaging dual-source power with a compound transmission system, the functions such as reducing circulation power and improving transmission efficiency can be realized.
7. In the hybrid multi-mode switching continuously variable transmission (CVT) system in the present invention, both the efficient input split zone and the efficient output split zone correspond to the forward direction, and the former is in the low speed section, while the latter is in the high speed section. The variable pump for input splitting is always driven by the input shaft, with a narrow range of rotation speed; the pump and motor for output splitting may rotate in two directions, and a separate oil compensation pump is often required.

IV. DESCRIPTION OF DRAWINGS

In the figures:
1—main clutch; 2—input shaft; 3—forward and back Tard gear assembly 3-1—backward acceleration driving gear; 3-2—backward acceleration driven gear; 3-3—shifting gear with splined hub; 3-4—backward idle gear; 3-5—backward deceleration driving gear; 4—hydraulic transmission assembly; 4-1—input shaft of variable pump; 4-2—variable pump; 4-3—hydraulic pipeline; 4-4—fixed displacement motor; 4-5—output shaft of fixed displacement motor; 5—hydraulic power output mechanism; 5-1—fourth clutch; 5-2—gear pair of hydraulic power output mechanism; 6—output shaft; 7—planetary gear convergence mechanism; 7-1—third clutch; 7-2—transmission gear pair of gear ring of convergence mechanism; 7-3—gear ring of convergence mechanism; 7-4—sun gear of convergence mechanism; 7-5—planet carrier of convergence mechanism; 7-6—second clutch; 8—intermediate shaft; 9—planetary gear split mechanism; 9-1—input shaft of planet carrier of split mechanism; 9-2—transmission gear pair of sun gear of split mechanism; 9-3—planet carrier of split mechanism; 9-4—sun gear of split mechanism; 9-5—gear ring of split mechanism; 9-6—brake; 9-7—first clutch; 10—power transmission mechanism; 10-1—gear pair of power transmission mechanism; 10-2—power output shaft; 11—power source; 11-1—engine; 11-2—coupling device; 11-3—motor; 11-4—power battery

V. EMBODIMENTS

Hereunder the present invention will be further described with reference to the drawings and specific examples, however, the protection scope of the present invention is not limited thereto.

Figure 1:
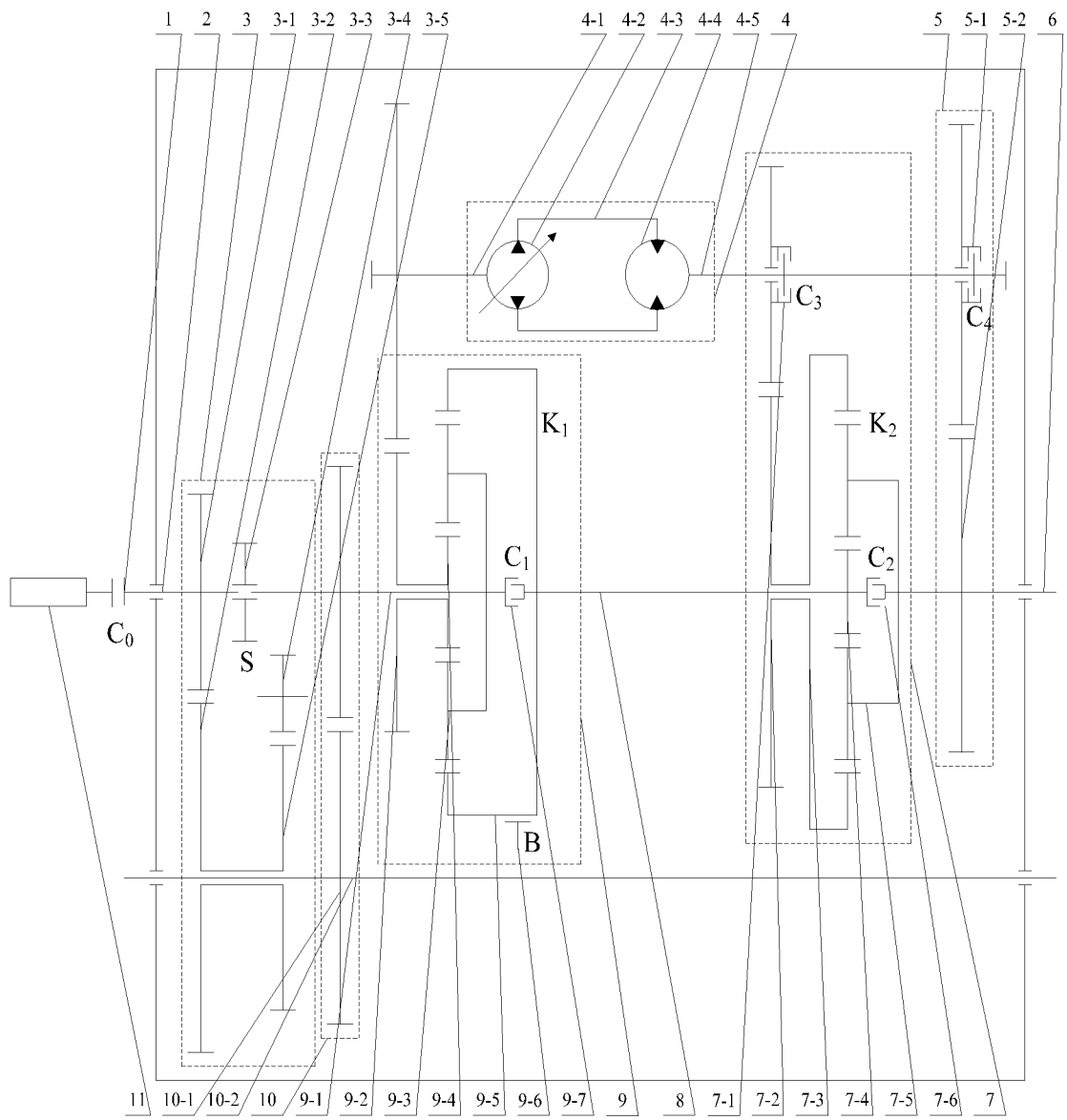
FIG. 1 is a schematic diagram of the hybrid multi-mode s itching continuously variable transmission (CVT) system in the present invention.

As shown in FIG. 1, the hybrid multi-mode switching continuously variable transmission (CVO system in the present invention comprises a main clutch 1, an input shaft 2, a forward and backward gear assembly 3, a hydraulic transmission assembly 4, a hydraulic power output mechanism 5, an output shaft 6, a planetary gear convergence mechanism 7, an intermediate shaft 8, a planetary gear split mechanism 9, a power transmission mechanism 10 and a power source 11. The main clutch 1 is configured to connect the power source 11 and the input shaft 2.

The forward and backward gear assembly 3 comprises a backward acceleration driving gear 3-1, a backward acceleration driven gear 3-2, a shifting gear with splined hub 3-3, a backward idle gear 3-4 and a backward deceleration driving gear 3-5; the backward acceleration driving gear 3-1 is engaged with the backward acceleration driven gear 3-2, and the backward acceleration driving gear 3-1 is connected with the input shaft 2; the backward idle gear 3-4 is engaged with the backward deceleration driving gear 3-5, and the backward acceleration driven gear 3-2 is rotated together with the backward deceleration driving gear 3-5; the shifting gear with splined hub 3-3 can realize rotation of the input shaft 2 and the planetary gear split mechanism 9 in the same direction or in the opposite directions.

The hydraulic transmission assembly 4 comprises an input shaft 4-1 of variable pump, a variable pump 4-2, a hydraulic pipeline 4-3, a fixed displacement motor 4-4, and an output shaft 4-5 of fixed displacement motor; the planetary gear split mechanism 9 is connected with the variable pump 4-2 via the input shaft 4-1 of variable pump; the variable pump 4-2 is connected with the fixed displacement motor 4-4 through the hydraulic pipeline 4-3 to provide power to the fixed displacement motor 4-4; the fixed displacement motor 4-4 is connected with the planetary gear convergence mechanism 7 via a third clutch 7-1 to rotate together; the fixed displacement motor 4-4 is connected with the hydraulic power output mechanism 5 via a fourth clutch 5-1 to rotate together.

The hydraulic power output mechanism 5 comprises the fourth clutch 5-1 and a gear pair 5-2 of hydraulic power output mechanism; the output shaft 4-5 of fixed displacement motor is connected with the gear pair 5-2 of hydraulic power output mechanism via the fourth clutch 5-1; the output end of the gear pair 5-2 of hydraulic power output mechanism is connected with the output shaft 6.

The planetary gear convergence mechanism 7 comprises a transmission gear pair 1-2 of gear ring of convergence mechanism, a gear ring 7-3 of convergence mechanism, a sun gear 7-4 of convergence mechanism and a planet carrier 7-5 of convergence mechanism; the planetary gear split mechanism 9 comprises an input shaft 9-1 of planet carrier of split mechanism, a transmission gear pair 9-2 of sun gear of split mechanism, a planet carrier 9-3 of split mechanism, a sun gear 9-4 of split mechanism and a gear ring 9-5 of split mechanism; a brake 9-6 is configured to selectively connect the gear ring 9-5 of split mechanism to a fixed part; a first clutch 9-7 is connected with a second clutch 7-6 via an intermediate shaft 8, and the gear ring 9-5 of split mechanism and the sun gear 7-4 of convergence mechanism are mounted on two ends of the intermediate shaft 8 respectively; the planet carrier 9-3 of split mechanism is mounted on the input shaft 9-1 of planet carrier of split mechanism, one end of the input shaft 9-1 of planet carrier of split mechanism may be connected with the input shaft 2 via the shifting gear 3-3 with splined huh, and the first clutch 9-7 is configured to selectively connect the input shaft 9-1 of planet carrier of split mechanism to the intermediate shaft 8 to rotate together; since the gear ring 9-5 of split mechanism is also mounted on the intermediate shaft 8, it also can be deemed that the first clutch 9-7 is configured to selectively connect the input shaft 9-1 of planet carrier of split mechanism to the gear ring 9-5 of split mechanism to rotate together; the second clutch 7-6 is configured to selectively connect the intermediate shaft 8 to the planet carrier 7-5 of convergence mechanism to rotate together. The transmission gear pair 9-2 of sun gear of split mechanism is configured to connect the input shaft 9-1 of planet carrier of split mechanism to the hydraulic transmission assembly 4, The input shaft 9-1 of planet carrier of split mechanism is connected with the planet carrier 9-3 of split mechanism Both the efficient input split zone and the efficient output split zone correspond to the forward direction, and the former is within the low speed section, while the latter is within the high speed section. The variable pump for input splitting is always driven by the input shaft, with a narrow range of rotation speed; the pump and motor for output splitting may rotate in two directions, and a separate oil compensation pump is often required.

The power transmission mechanism 10 comprises a gear pair 10-1 of power transmission mechanism and a power output shaft 10-2. The gear pair 10-1 of power transmission mechanism is configured to connect the power output shaft 10-2 and the input shaft 2.

When the shifting gear 3-3 with splined hub is engaged with the input shaft 9-1 of planet carrier of split mechanism, the vehicle is in a forward gear position, and the power is transferred directly to the input shaft 9-1 of planet carrier of split mechanism via the input shaft 2; when the shifting gear 3-3 with splined hub is engaged with the backward idle gear 3-4, the vehicle is in a backward gear position, and the power is transferred to the input shaft 9-1 of planet carrier of split mechanism via the backward acceleration driving gear 3-1, the backward acceleration driven gear 3-2, the backward deceleration driving gear 3-5 and the backward idle gear 3-4.

Figure 3:
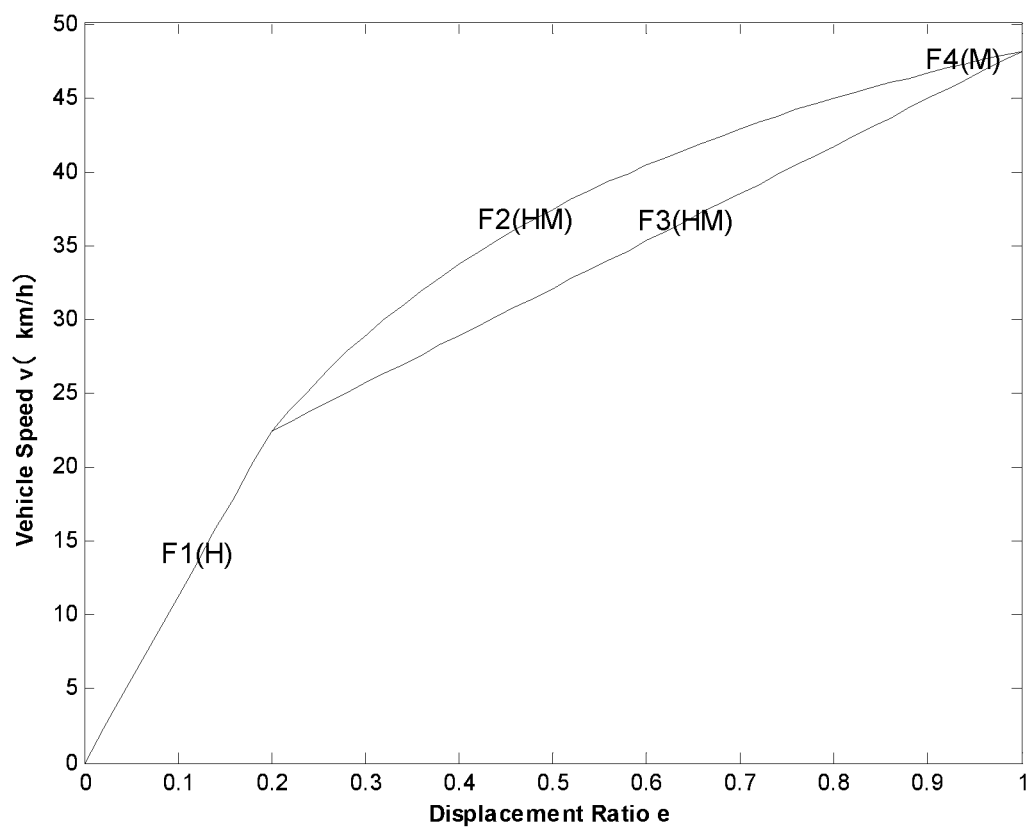
FIG. 3 shows the speed controlling characteristics of the hybrid multi-mode switching continuously variable transmission (CVT) system in the present invention.

As shown in FIG. 3, forward transmission modes (hydraulic transmission, mechanical transmission and hydro-mechanical transmission) between the input component and the output component are provided by adjusting the displacement ratio of the hydraulic transmission assembly 4 and selectively controlling the engagement of the first clutch 9-7, the second clutch 7-6, the third clutch 7-1, the fourth clutch 5-1 and the brake 9-6.

Please see Table 1. Hereunder the forward gear position of the vehicle is used as example for illustration:

When the fourth clutch 5-1 is engaged with the brake 9-6, the transmission mode is a hydraulic transmission mode, which is denoted as F1 (H). The power transmitted to the input shaft 9-1 of planet carrier of split mechanism is transmitted to the hydraulic transmission assembly 4 via the planet carrier 9-3 of split mechanism, the sun gear 9-4 of split mechanism and the transmission gear pair 9-2 of sun gear of split mechanism, then the input shaft 4-1 of variable pump drives the variable pump 4-2, the fluid flows through the hydraulic pipeline 4-3 and drives the fixed displacement motor 4-4 to rotate, so that mechanical energy is outputted from the output shaft 4-5 of fixed displacement motor, and thereby power is outputted from the output shaft 6 via the gear pair of hydraulic power output mechanism. At this point, if the shifting gear 3-3 with splined hub is engaged with the backward idle gear 3-4, the vehicle is in a backward gear position, which is denoted as R (H).

When the second clutch 7-6 is engaged with the third clutch 7-1, the transmission mode is a hydro-mechanical transmission mode (i.e., input splitting), which is denoted as F2 (HM). At this point, the planetary gear convergence mechanism 7 is fixedly connected as a whole, the power transmitted to the input shaft 9-1 of planet carrier of split mechanism is split into two branches via the planet carrier 9-3 of split mechanism, wherein one branch of power is transmitted to the hydraulic transmission assembly 4 via the sun gear 9-4 of split mechanism and the transmission gear pair 9-2 of sun gear of split mechanism, and then is converged via the transmission gear pair 7-2 of gear ring of convergence mechanism with the power transmitted directly to the planetary gear convergence mechanism 7 via the gear ring 9-5 of split mechanism and the intermediate shaft 8, and the converged power is outputted from the output shaft 6.

When the first clutch 9-7 is engaged with the third clutch 7-1, the transmission mode is a hydro-mechanical transmission mode (i.e., output splitting), which is denoted as F3 (HM). At this point, the planetary gear split mechanism 9 is fixedly connected as a whole, a part of the power transmitted to the input shaft 9-1 of planet carrier of split mechanism is transmitted to the hydraulic transmission assembly 4 via the input shaft 9-1 of planet carrier of split mechanism, and then is transmitted to the gear ring 7-3 of convergence mechanism via the transmission year pair 7-2 of gear ring of convergence mechanism, and converged with the power transmitted directly to the sun gear 7-4 of convergence mechanism via the planetary gear split mechanism 9 and the intermediate shaft 8 so as to be transmitted to the planet carrier of convergence mechanism 7-5 and outputted from the output shaft 6.

When the first clutch 9-7 is engaged with the second clutch 7-6, the transmission mode is a mechanical transmission mode, which is denoted as F4 (M). The power transmitted to the input shaft 9-1 of planet carrier of split mechanism is outputted from the output shaft 6 via the planetary gear split mechanism 9, the intermediate shaft 8 and the planetary gear convergence mechanism 7.

TABLE 1

Schematic Diagram of Operation of the Major Elements of the Variable Transmission Device

| Gear position and transmission mode | Engaged element | | | | | |
|---|---|---|---|---|---|---|
| | S | $C_1$ | $C_2$ | $C_3$ | $C_4$ | B |
| F1 (H) - hydraulic transmission mode | Forward gear | Disengaged | Disengaged | Disengaged | Engaged | Engaged |
| F2 (HM) - hydro-mechanical transmission mode (input splitting) | | Disengaged | Engaged | Engaged | Disengaged | Disengaged |
| F3 (HM) - hydro-mechanical transmission mode (output splitting) | | Engaged | Disengaged | Engaged | Disengaged | Disengaged |
| F4 (M) - mechanical transmission mode | | Engaged | Engaged | Disengaged | Disengaged | Disengaged |
| R (H) - hydraulic transmission mode | Backward gear | Disengaged | Disengaged | Disengaged | Engaged | Engaged |

In Table 1, S represents the shifting gear with splined hub; $C_1$ represents the first clutch 9-7; $C_2$ represents the second clutch 7-6; $C_3$ represents the third clutch 7-1; $C_4$ represents the fourth clutch 5-1; B represents the brake 9-6.

As shown in FIG. 3, switching of forward transmission modes between the input component and the output component may be performed by adjusting the displacement ratio of the hydraulic transmission assembly 4, specifically: switching from hydraulic transmission to hydro-mechanical transmission by increasing the displacement ratio of the hydraulic transmission assembly 4 linearly;
on the basis of hydro-mechanical transmission, switching from hydro-mechanical transmission to mechanical transmission by increasing the displacement ratio of the hydraulic transmission assembly 4 linearly or non-linearly.

In case that the variable pump 4-2 is an one-way variable pump and the fixed displacement motor 4-4 is an one-way fixed displacement motor, a forward and backward gear assembly 3 has to be mounted to realize backward gear hydraulic transmission; however, backward gear may be realized simply by means of a volumetric speed control circuit composed of a two-way variable pump and a fixed displacement motor. If the displacement range of the one-way variable pump is $[0, V_{max}]$, the displacement range of the two-way variable pump is $[-V_{max}, V_{max}]$. Backward gear may be realized simply by setting the displacement of the two-way variable pump to a negative value. Backward gear is only implemented by means of hydraulic transmission.

Figure 2:
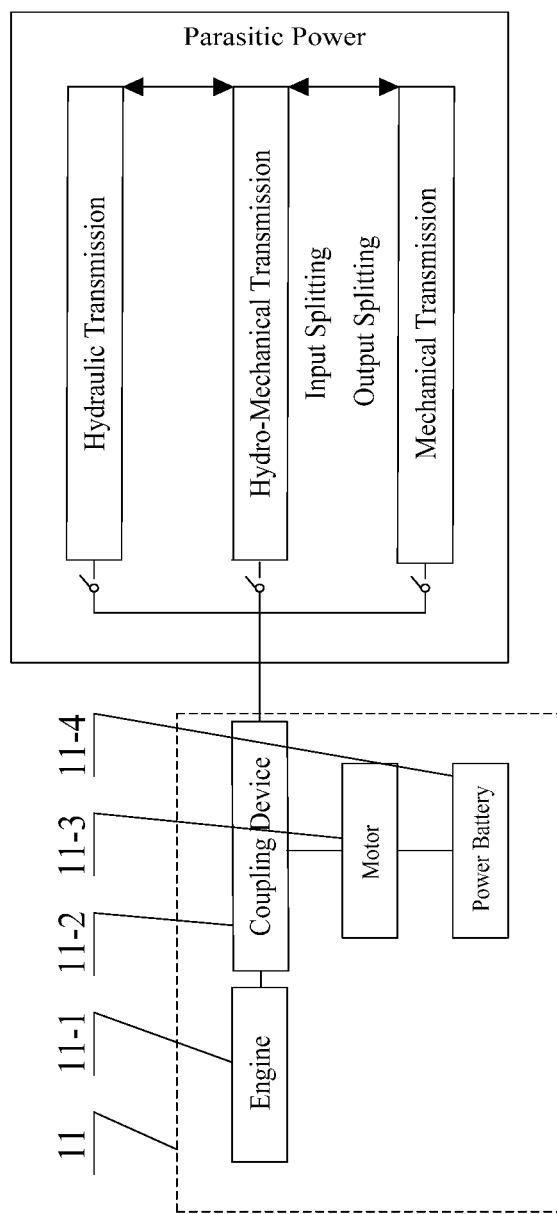
FIG. 2 is a schematic diagram for power input in the present invention.

As shown in FIG. 2, the power source 11 comprises an engine 11-1, a coupling device 11-2, a motor 11-3 and a power battery 11-4; a motor power source composed of the power battery 11-4 and the motor 11-3 may be used in combination with the engine 11-1 power source to supply power to the variable transmission system via the coupling device 11-2. A compound transmission system may be formed by controlling the hybrid power with different power mixing ratio in combination with continuous forward or backward transmission modes between the input component and the output component, and the power can be allocated reasonably with an optimization algorithm, so as to realize functions including motor-assisted starting, gear shifting shock reduction and climbing power improvement, etc.

In the starting stage, the engine 11-1 operates in a low-efficiency zone due to low vehicle speed; at this point, the motor 11-3 drives separately to improve the transmission efficiency. After the vehicle speed reaches a certain value, the engine 11-1 operates in a high-efficiency zone; in this stage, the engine 11-1 drives separately; if the output torque of the engine 11-1 is excessive and the motor power source requires charging, the power battery 11-4 may be charged via the motor 11-3 so as to realize energy recovery. When the driver accelerates rapidly or the vehicle climbs, the entire vehicle has a high demand for torque. In order to provide enough power, the motor power source and the engine 11-1 power source should serve as dual power sources and drive at the same time.

During gear shifting, in order to reduce gear shifting shock, a dynamic coordination and control algorithm is used to realize real-time compensation for engine torque from motor torque, so as to improve the quality of gear shifting. During power output, to increase transmitted power and improve response speed, the dual power sources are engaged with the compound transmission system, so as to improve the quality of gear shifting and reduce circulation power.

A static energy management algorithm is used to identify mode switching, and coordinate and control the target torques of the engine 11-1 and the motor 11-3. The gear shifting involves not only the engine 11-1 and the motor 11-3, but also the clutch assembly and the brake, and there is switching among multiple modes. A hybrid system optimization control scheme is employed to solve the problem of gear shifting quality optimization; continuous speed regulation in a gear position may be performed under a self-adaptation theory with feedback function. The operating efficiency of the engine is lower at lower speed under light load, and higher under medium to heavy loads; the motor not only has a characteristic of high torque at low speed, but also supports accurate and rapid control. During gear shifting, a dynamic torque control method is utilized to realize real-time compensation for engine torque from motor torque, so that the fluctuation of the combined torque of the engine and the motor is controlled within a certain range, to improve driving smoothness and comfort of the vehicle.

In addition, according to the control strategy set by the energy management system, the power provided by the power source 11 may be outputted to drive other mechanisms via the power output shaft 10-2, in addition to meeting the requirement of the traveling device. Thus, performance optimization and matching between the dual power sources and the entire power transmission system are realized.

For example, for a large-size engineering or agricultural vehicle: when the vehicle is in a starting or climbing stage, since the travelling device consumes energy heavily, the power transmission mechanism 10 may output zero power or less power.

When the vehicle is in a mechanical transmission gear position, the dual power sources composed of the engine power source and the motor power source may output full power for the travelling system. At this point, the vehicle speed may reach a theoretical maximum value.

When the vehicle is in a hydro-mechanical transmission gear position, the dual power sources may provide a part of the power for the travelling system, and another part of power for external work.

The circulation power and transmission efficiency of a hydro-mechanical transmission system is highly related with the configuration of the system. When gear transmission ratio and planetary gear characteristic parameters are determined, the circulation power and transmission efficiency are related with displacement ratio and splitting scheme. By coordinating and controlling the electronic control unit, transmission control unit and battery management system with the vehicle controller, the system energy can be optimized in different power output and travel states.

When the vehicle is motionless, the dual power sources may output their full power to the power output shaft 10-2. At this point, the working power is maximum.

When the power output shaft 10-2 is braked, the energy may be stored to the power battery 11-4 via the coupling device 11-2 and the motor 11-3.

The above mentioned example is a preferred embodiment of the present invention, however the present invention is not limited thereto. Any obvious improvement, replacement or variation that can be made by the person skilled in the art without departing from the spirit of the present invention shall be deemed as falling in the protection scope of the present invention.

The invention claimed is:

1. A hybrid multi-mode switching continuously variable transmission system, said system comprising an input component, an output component, a clutch assembly, a brake, a hydraulic transmission assembly and a planetary gear assembly, wherein the input component is connected with the hydraulic transmission assembly, the output component is connected with the planetary gear assembly, the clutch assembly connects the input component and the hydraulic transmission assembly to the planetary gear assembly and the brake and the clutch assembly provide a stepped forward or backward transmission ratio between the input component and the output component, wherein a hydraulic transmission mode, a mechanical transmission mode, a hydro-mechanical transmission mode, and a reverse hydraulic transmission mode are provided between the input component and the output component by adjusting a displacement ratio of the hydraulic transmission assembly and selectively controlling an engagement between the clutch assembly and the brake, and wherein the planetary gear assembly comprises a planetary gear split mechanism and a planetary gear convergence mechanism; the clutch assembly comprises a first clutch, a second clutch, and a third clutch; a gear ring of the planetary gear split mechanism is connected with a sun gear of the planetary gear convergence mechanism;

the first clutch is configured to selectively connect the gear ring of the planetary gear split mechanism to a planet carrier of the planetary gear split mechanism to rotate together; the second clutch is configured to selectively connect the sun gear of the planetary gear convergence mechanism to a planet carrier of the planetary gear convergence mechanism to rotate together; the third clutch is configured to selectively connect the hydraulic transmission assembly to the planetary gear convergence mechanism to rotate together; and the hydro-mechanical transmission mode between the input component and the output component is provided by adjusting the displacement ratio of the hydraulic transmission assembly and selectively controlling the engagement of the first clutch, the second clutch and the third clutch.

2. The hybrid multi-mode switching continuously variable transmission system according to claim 1, wherein switching of the hydraulic transmission mode, the hydro-mechanical transmission mode, and the mechanical transmission mode between the input component and the output component are realized by adjusting the displacement ratio of the hydraulic transmission assembly.

3. The hybrid multi-mode switching continuously variable transmission system according to claim 2, wherein switching of the hydraulic transmission mode, the hydro-mechanical transmission mode, and the mechanical transmission mode between the input component and the output component comprises:

switching from the hydraulic transmission mode to the hydro-mechanical transmission mode by increasing the displacement ratio of the hydraulic transmission assembly linearly; on the basis of the hydro-mechanical transmission, switching from the hydro-mechanical transmission mode to the mechanical transmission mode by increasing the displacement ratio of the hydraulic transmission assembly linearly or non-linearly.

4. The hybrid multi-mode switching continuously variable transmission system according to claim 1, wherein the mechanical transmission mode between the input component and the output component is provided by adjusting the displacement ratio of the hydraulic transmission assembly and selectively controlling the engagement of the first clutch and the second clutch.

5. The hybrid multi-mode switching continuously variable transmission system according to claim 1, wherein the clutch assembly further comprises a fourth clutch configured to selectively connect the hydraulic transmission assembly to the output component to rotate together; the brake is configured to selectively connect the gear ring of the planetary gear split mechanism to a fixed part; the hydraulic transmission mode or the reverse hydraulic transmission mode between the input component and the output component is provided by adjusting the displacement ratio of the hydraulic transmission assembly and controlling the engagement of the fourth clutch and the brake.

6. The hybrid multi-mode switching continuously variable transmission system according to claim 1, wherein the hydro-mechanical transmission mode is an output splitting hydro-mechanical transmission mode between the input component and the output component, and is provided by engaging the first clutch and the third clutch, and further including an input splitting hydro-mechanical transmission mode between the input component and the output component provided by engaging the second clutch and the third clutch.

* * * * *